US010104537B2

(12) United States Patent
Wu

(10) Patent No.: US 10,104,537 B2
(45) Date of Patent: Oct. 16, 2018

(54) TERMINAL PERIPHERAL CONTROL METHOD, M2M GATEWAY, AND COMMUNICATIONS SYSTEM

(71) Applicant: ZTE CORPORATION, Shenzhen, Guangdong Province (CN)

(72) Inventor: Hao Wu, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 14/900,617

(22) PCT Filed: Oct. 11, 2013

(86) PCT No.: PCT/CN2013/085041
§ 371 (c)(1),
(2) Date: Dec. 22, 2015

(87) PCT Pub. No.: WO2014/205956
PCT Pub. Date: Dec. 31, 2014

(65) Prior Publication Data
US 2016/0157091 A1 Jun. 2, 2016

(30) Foreign Application Priority Data

Jun. 24, 2013 (CN) .......................... 2013 1 0253834

(51) Int. Cl.
*H04W 8/24* (2009.01)
*H04W 4/70* (2018.01)
*H04W 12/06* (2009.01)
(52) U.S. Cl.
CPC ............... *H04W 8/24* (2013.01); *H04W 4/70* (2018.02); *H04W 12/06* (2013.01)
(58) Field of Classification Search
CPC ........................................................ H04W 8/24
See application file for complete search history.

(56) References Cited

U.S. PATENT DOCUMENTS

2005/0063326 A1* 3/2005 Ohkuma ................. H04Q 9/00
370/310
2005/0159823 A1* 7/2005 Hayes .................... G05B 15/02
700/19
(Continued)

FOREIGN PATENT DOCUMENTS

CN 102136934 A 7/2011
CN 102378162 A 3/2012
(Continued)

OTHER PUBLICATIONS

Technical Specification Group Services and System Aspects; Study on enhancements for Machine-Type Communications(MTC); (Release 12); 3rd Generation Partnership Project; 3GPP TR 22.888 V12.0. 0(Mar. 2013).
(Continued)

*Primary Examiner* — John Blanton
(74) *Attorney, Agent, or Firm* — Ling Wu; Stephen Yang; Ling and Yang Intellectual Property

(57) ABSTRACT

Disclosed are a terminal peripheral control method, a machine to machine (M2M) gateway, and a communication system, wherein the method includes: a M2M gateway receiving a transaction control message sent by a control device or a M2M service platform, wherein the transaction control message includes transaction information corresponding to one or more operations and required to be executed; the M2M gateway sending an operation command to a terminal peripheral according to the transaction information required to be executed; the M2M gateway receiving a command feedback message from the terminal peripheral, wherein the command feedback message includes an operation command execution result; and the M2M gateway sending a control feedback message to the control device or the M2M service platform, wherein the control feedback
(Continued)

message carries a transaction execution result obtained according to the operation execution result.

16 Claims, 6 Drawing Sheets

(56) References Cited

U.S. PATENT DOCUMENTS

| | | | |
|---|---|---|---|
| 2011/0213871 A1 | 9/2011 | DiGirolamo et al. | |
| 2012/0047551 A1* | 2/2012 | Pattar | H04W 4/00 726/1 |
| 2013/0013555 A1 | 1/2013 | Foti | |
| 2013/0346504 A1* | 12/2013 | Huang | H04L 12/185 709/204 |
| 2014/0351949 A1* | 11/2014 | Zhang | H04W 4/005 726/26 |
| 2015/0381776 A1* | 12/2015 | Seed | H04L 67/16 709/203 |

FOREIGN PATENT DOCUMENTS

| | | |
|---|---|---|
| EP | 2547040 A1 | 1/2013 |
| EP | 2605610 A1 | 6/2013 |

OTHER PUBLICATIONS

Machine-to-Machine communications(M2M); Functional architecture; ETSI TS 102 690 v2.0.13(May 2013).
XP054975383; https://www.youtube.com/watch?v=SkdVsLzOxCc. Somfy Domotique: Découvrez TaHoma® de Somfy—Solution domotique pour piloter votre maison ! Published on Nov. 5, 2010.

* cited by examiner

TERMINAL PERIPHERAL CONTROL METHOD, M2M GATEWAY, AND COMMUNICATIONS SYSTEM

TECHNICAL FIELD

The present document relates to the field of communications, and more particularly, to a terminal peripheral control method, a machine to machine (M2M) gateway and a communication system.

BACKGROUND OF THE RELATED ART

The M2M communication network extends the communication category and the communication area of existing information communication networks, obtains information from the physical world by embedding intelligence and communication capabilities into a variety of possible things, and enhances and upgrades the intelligence, interaction and degree of automation of existing information communication network services based on analyzing and processing the information.

The M2M communication network has a variety of network morphologies, and it can be an individual physical network constructed separately, or a logical network built on top of existing public communications networks and a variety of government and enterprise private networks.

The M2M communication network in terms of the logic function can be divided into three layers, namely, the perception extension layer, network/service layer and application layer.

The perception extension layer: the perception extension layer mainly achieves the collection, automatic identification and intelligent control of the physical world information. All kinds of things themselves in the physical world do not have the communication capability. Sensors, actuators, intelligent apparatus, RFID reader-writer and other intelligent nodes collect information in the physical world and exchange information with the network layer through the communication module. The main components therein are M2M terminal device and M2M gateway device.

The network/service layer: the network/service layer supports the transfer, routing and control of the information of the perception layer, and provides a support for communications between people and things as well as between things and things in the Internet of things. Combined of the classification of the Internet of Things, the network morphologies included in the network layer comprise: communication network, Internet, as well as industry networks. The main component therein is the M2M platform.

The application layer: the application layer comprises a variety of applications of the Internet of things, both public services and industry services, and the industry services can be industry public services facing the public, and it can also be industry-specific services that meet the particular application needs within the industry. Wherein the public services are basic services such as intelligent home and mobile payment provided for common public's demands. The industry-specific services are usually facing the industry's particular demands and provide services such as intelligent grids, intelligent transportation, intelligent environment and so on within the industry; wherein part of industry services such as intelligent transportation may also be provided for the public and are called industry public services. The main component comprised therein is the M2M application server, referred to as M2M application.

The terminal peripheral refers to a single device such as a sensor having environment perception function, and it can send the perceived information to a M2M service platform via a M2M gateway and can also receive the downlink control implemented by the M2M service platform.

The terminal application is a software module running on the terminal peripheral, and it is a logical unit for implementing the M2M service.

For the M2M gateway, the M2M terminal peripheral cannot directly communicate with a communication network because of its processing capability, storage capability and limited power and other features, and it needs to access the communication network through the M2M gateway. The M2M gateway can perform the protocol conversion between the M2M perception extension layer and the upper-layer network. Besides of gathering and forwarding data information collected by the M2M terminal peripheral, the M2M gateway can also receive the control information of the M2M service platform and manage the terminal peripheral.

With the diversification of M2M applications, the number of M2M terminal peripherals executing a variety of applications in a set of M2M application system grows substantially, and the resulting problem is a surge of signaling, leading to consume a large amount of network resources especially scarce radio resources.

SUMMARY OF THE INVENTION

The embodiment of the present invention provides a terminal peripheral control method, a machine to machine gateway and a communication system to address the problem that the existing method leads to a shortage of network resources.

The embodiment of the present invention provides a terminal peripheral control method, comprising:

a Machine to Machine (M2M) gateway receiving a transaction control message sent by a control device or a M2M service platform, wherein the transaction control message comprises transaction information corresponding to one or more operations and required to be executed;

the M2M gateway sending an operation command to a terminal peripheral according to the transaction information required to be executed; and the M2M gateway receiving a command feedback message from the terminal peripheral, wherein the command feedback message comprises an operation command execution result; and the M2M gateway sending a control feedback message to the control device or the M2M service platform, wherein the control feedback message carries a transaction execution result obtained according to an operation execution result.

Alternatively, the method further comprises:

after receiving the transaction control message, the M2M gateway setting a transaction valid time based on the received transaction control message;

when a command execution successful result is not received within the transaction valid time, the M2M gateway resending the operation command to the terminal peripheral.

Alternatively, the transaction information comprises one or more operations as well as information of the terminal peripheral executing the operations; or, the transaction information is a transaction identifier;

the method further comprises:

before the M2M gateway sends the operation command to the terminal peripheral, searching for one or more operations corresponding to the transaction identifier as well as the corresponding terminal peripheral information according to a local database.

Alternatively, the operation command sent by the M2M gateway to the terminal peripheral is for a single operation or all operations of the terminal peripheral.

Alternatively, the command feedback message further comprises feedback data.

Alternatively, before the M2M gateway receives the transaction control message of the control device, the M2M gateway performs an access authentication on the control device according to a local user information database.

Alternatively, the method further comprises: before the M2M gateway receives the transaction control messages of the control device, a M2M service platform or a M2M application server performing a user verification on the control device according to the user information database;

when the authentication is successful, the M2M service platform or the M2M application server sending a verification result to the M2M gateway; and the M2M gateway performing an access authentication on the control device according to the authentication result.

Alternatively, the method further comprises: after the M2M gateway receives the transaction control message, and before the transaction valid time is set, the M2M gateway performing an operation authority authentication on transaction information required to be executed according to the local user information database, wherein the operation authority authentication is successful.

The embodiment of the present invention further provides a machine to machine (M2M) gateway, comprising:

a control message receiving module, configured to: receive a transaction control message sent by a control device or a M2M service platform, wherein the transaction control message comprises transaction information corresponding to one or more operations and required to be executed;

a command sending module, configured to: send an operation command to the terminal peripheral according to the transaction information required to be executed;

a command feedback receiving module, which is configured to: receive a command feedback message from the terminal peripheral, wherein, the command feedback message comprises an operation command execution result; and a control feedback module, which is configured to: send a control feedback message to the control device or the M2M service platform, wherein, the control feedback message carries a transaction execution result obtained according to the operation execution result.

Alternatively, the M2M gateway further comprises:

a time setting module, which is configured to: set a transaction valid time based on the received transaction control message;

The command sending module is further configured to: during the transaction valid time, re-send an operation command to the terminal peripheral when receiving a command execution failure result.

Alternatively, the transaction information comprises one or more operations as well as information of the terminal peripheral executing the operations; or, the transaction information is a transaction identifier;

the command sending module is further configured to: before sending an operation command to the terminal peripheral, search for one or more operations corresponding to the transaction identifier as well as the corresponding terminal peripheral information in accordance with a local database.

Alternatively, the operation command sent by the M2M gateway to the terminal peripheral is for a single operation or for all operations of the terminal peripheral.

The embodiment of the present invention further provides a machine to machine (M2M) communication system, comprising: the abovementioned M2M gateway and terminal peripheral as well as at least one of the control device, M2M service platform and M2M application server, wherein:

the control device or M2M service platform comprises:

a control message sending module, which is configured to: send a transaction control message to the M2M gateway;

the terminal peripheral comprises:

a command receiving module, which is configured to: receive an operation command sent by the M2M gateway;

a command execution module, which is configured to: execute the operation command; and an command feedback module, which is configured to: send an operation command feedback message to the M2M gateway.

Alternatively, the M2M service platform or the M2M application server comprises:

a user information sending module, which is configured to: send user information registered by a user to the M2M gateway, or, the M2M service platform or the M2M application server further comprises:

a user verification module, which is configured to: perform a user verification according to a user information database, and send a user verification result to the M2M gateway.

In the terminal peripheral control method and the M2M gateway as well as the communication system in accordance with the embodiment of the present invention, the M2M gateway receives an transaction control message sent by the control device or the M2M service platform, namely, the control device or the M2M service platform takes a transaction as the unit to send the signaling, one transaction corresponds to one or more operations, and it may also correspond to a plurality of terminal peripherals, thus greatly reducing the amount of signaling and saving network resources.

PREFERRED EMBODIMENTS OF THE INVENTION

Hereinafter, in conjunction with the accompanying drawings, the technical solution in accordance with the embodiment of the present invention will be described in detail. It should be noted that, in the case of no conflict, embodiments and features in the embodiments of the present application can be combined with each other.

The First Embodiment

Figure 1:
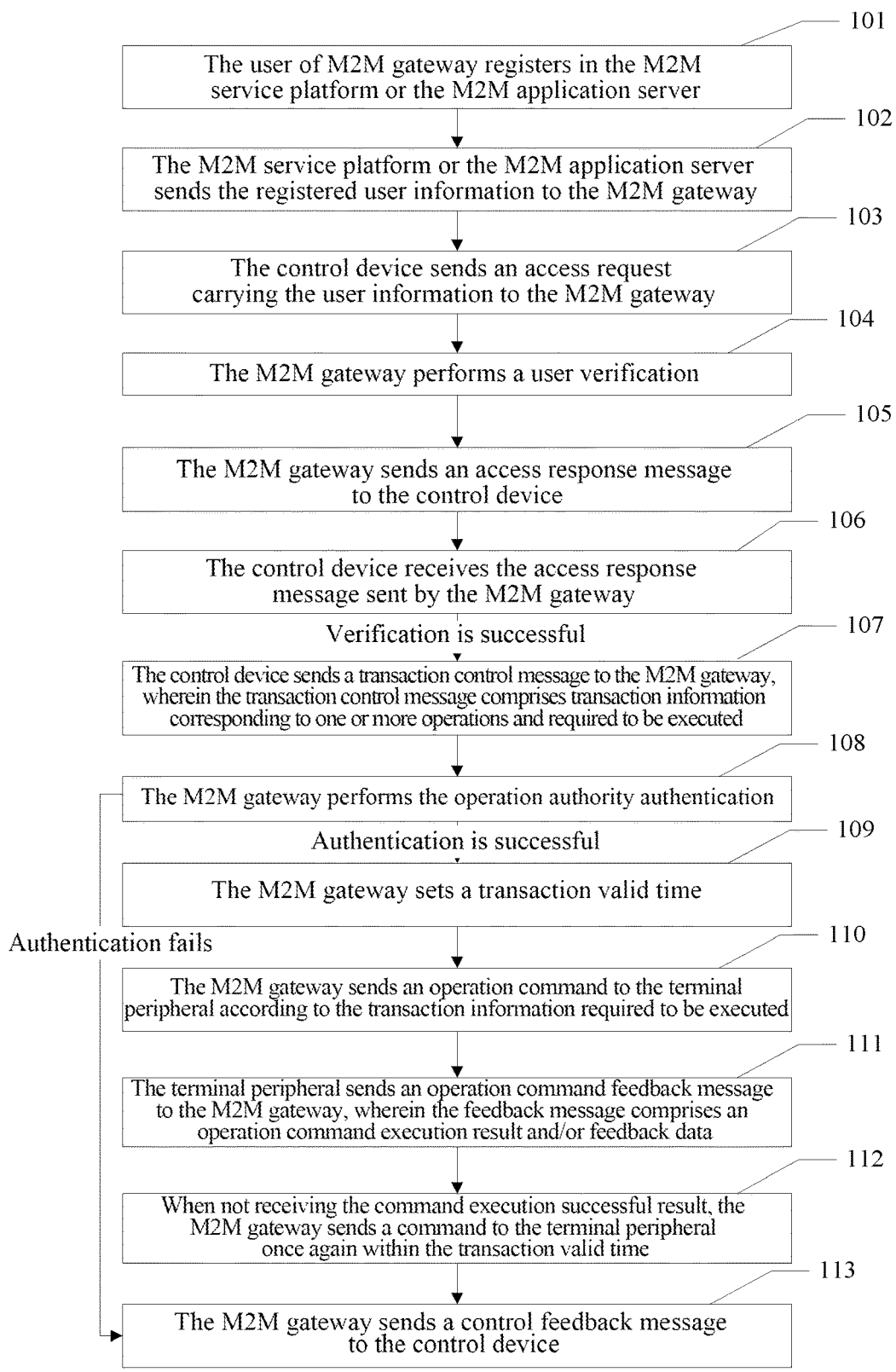
FIG. 1 is a schematic diagram of the flow chart of a terminal peripheral control method in accordance with a first embodiment of the present invention.

The schematic diagram of the flow chart of the terminal peripheral control method in accordance with the first embodiment of the present invention is shown in FIG. 1, and the control device in the first embodiment does not log in and is locally verificated by the M2M gateway, and the method comprises the following steps:

in step 101, the user of M2M gateway registers in the M2M service platform or the M2M application server.

the user who needs to access the M2M gateway can only access the M2M gateway after being successfully registered in the M2M service platform or the M2M application server.

The user needs to register a user name and password under the permission of the M2M application service provider, for example, Username: user1
Password: 123456 in step 102, the M2M service platform or the M2M application server sends the registered user information (such as user name and password) to the M2M gateway.

The M2M gateway updates the local user information database according to the received user information.

In step 103, the control device sends an access request carrying the user information to the M2M gateway.

The control device selects the M2M gateway to be connected in the local interface, and inputs the user name and password, and includes them in the access request and sends it to the M2M gateway.

The control device stated in the embodiment of the present invention refers to a device such as a mobile phone, a tablet PC as well as a special control device that accesses and controls the terminal peripheral through the M2M end network.

In step 104, the M2M gateway performs a user verification.

After receiving the user name and password of the control device, the M2M gateway searches whether there is the user name in the local user information database or not, if yes, then it verifies whether the password corresponding to the user in the local user information database is consistent with the password of the user name sent by the control device or not.

In step 105, the M2M gateway sends an access response message to the control device.

If the password in the local user information database is inconsistent with the password sent by the control device, the M2M gateway sends an access response message to the control device and indicates in the access response message that the access fails.

If the password in the local user information database is consistent with the password sent by the control device, the M2M gateway sends an access response message to the control device and indicates in the access response message that the access is successful.

In step 106, the control device receives the access response message sent by the M2M gateway; if the access response message indicates that the access is successful, it is to proceed to step 107, and if the access response message indicates that the access fails, the process ends.

In step 107, the control device sends a transaction control message to the M2M Gateway, wherein the transaction control message comprises transaction information corresponding to one or more operations and required to be executed.

The transaction information comprises one or more operations as well as information of the terminal peripheral executing the operations; or, the transaction information is a transaction identifier; before sending a command to the terminal peripheral, the M2M gateway searches for one or more operations corresponding to the transaction identifier as well as the corresponding terminal peripheral information according to the local database.

For example, executing transactions required to be executed in the leaving-home mode operation in the intelligent home system comprise turning off all lights, closing curtains, turning off air conditioning, TV, stereo and setting the door alarm.

In the embodiment of the present invention, one transaction control message may correspond to the same operation of a plurality of terminal peripherals, or a plurality of operations of one terminal peripheral or a plurality of operations of a plurality of terminal peripherals, understandably, the transaction control message reduces the control signaling and saves network resources to some extent.

In step 108, the M2M gateway performs the operation authority authentication, and if the authority authentication is successful, it is to proceed to step 109, and if the authority authentication fails, it is to proceed to step 113.

After receiving the transaction control message sent by the control device, the M2M gateway searches for the operation authority corresponding to the user in the local user information database, and if the operations contained in the transaction are not permitted, the M2M gateway sends a control feedback message to the control device, and the control feedback message indicates that there is no authority to execute the transaction. The operation authority is set when the user registers, and the allowable operations corresponding to each operation authority are preconfigured in the gateway, and the operation authority is set as follows:

administrator operation authority: allow modifying the configuration parameters of the terminal peripheral and the gateway, allow upgrading the software or firmware of the terminal peripheral and the gateway, and allow executing various command operations on the terminal peripheral and the gateway.

Family member operation authority: allow performing various command operations on the terminal peripheral and the gateway, allow reading the terminal peripheral data, such as, the degree of the intelligent electrical meter, the degree of the intelligent gas meter as well as the degree of the intelligent water meter.

Guest operation authority: allow performing the video sharing operation and the multi-screen sharing operation.

In step 109, the M2M gateway sets a transaction valid time.

The transaction valid time is a reasonable data determined by the manufacturer according to the data in the actual operation experiment, through fully considering factors such as network delay, time needed by the operation execution as well as the signaling processing delay of the terminal peripheral.

In step 110, the M2M gateway sends an operation command to the terminal peripheral according to the transaction information required to be executed.

The operation command sent by the M2M gateway to the terminal peripheral is for a single operation, or for all operations of the terminal peripheral.

Understandably, corresponding to a received transaction control message, the M2M gateway may need to send a plurality of operation commands to one or more terminal peripherals.

The single operation contained in the transaction indicates which terminal peripheral will execute the operation. The executing logic unit is the M2M application running in the terminal peripheral.

In step 111, the terminal peripheral sends an operation command feedback message to the M2M gateway, wherein the feedback message comprises an operation command execution result (the operation is successful or fails), and/or feedback data.

In step 112, when not receiving the command execution successful result, the M2M gateway sends a command to the terminal peripheral once again within the transaction valid time.

Herein the "not receiving the command execution successful result" comprises two cases, the first is receiving a failure result, and the second is not receiving any feedback.

Alternatively, each operation command is set with a maximum waiting time, if no success or failure feedback is received from the terminal peripheral within this maximum waiting time and it is also within the transaction valid time, the operation command is re-sent.

Because of different communication environments (for example, some terminal peripherals are connected with the M2M gateway through a wired connection, and some other terminals peripherals are connected with the M2M gateway through wireless fidelity (WIFI) connection, and the wireless communication can be affected, such as being disturbed or going through walls, causing the execution to fail), some operations may fail to be executed successfully, thus resulting in the failure to execute the entire transaction, and after the network feedback fails, the M2M service platform may need to re-execute again, which increases the signaling interaction and consumes unnecessary network resources. For this situation, alternatively, after receiving a transaction control message, the M2M gateway in accordance with the embodiment of the present invention sets a transaction valid time based on the received transaction control message, namely, it provides a buffering time to various operations in the transaction executed by the gateway and allows attempting to execute the failed operations again in the transaction valid time, thereby increasing the transaction execution successful rate, reducing the signaling overhead, and saving network resources.

Understandably, the step 109 and step 112 are optional.

In step 113, the M2M gateway sends a control feedback message to the control device.

If the operation fails within the transaction valid time, the M2M gateway sends a control feedback message to the control device, wherein the control feedback message indicates that the transaction execution fails.

After all operations are executed successfully, the M2M gateway sends a control feedback message to the control device, wherein the control feedback message indicates that the transaction is executed successfully and/or the feedback data. It comprises three cases herein: A, only indicating that the transaction is executed successfully; B, only indicating the feedback data; C indicating that the transaction is executed successfully and also comprising the feedback data.

If the operating authority authentication fails, the M2M gateway sends a control feedback message to the control device, wherein the control feedback message indicates that there is no authority to execute the transaction.

The Second Embodiment

Figure 2:
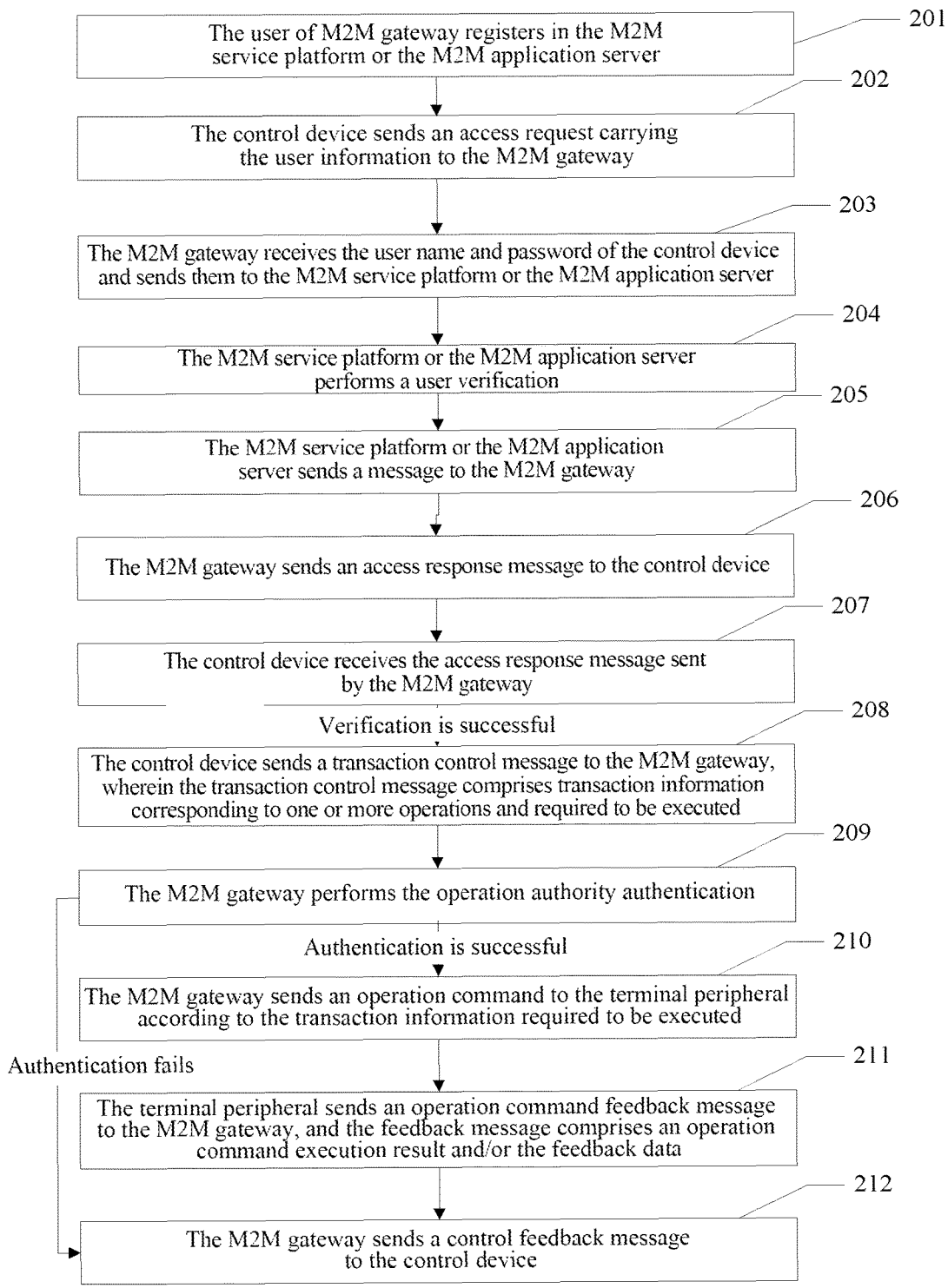
FIG. 2 is a schematic diagram of the flow chart of a terminal peripheral control method in accordance with a second embodiment of the present invention.

The schematic diagram of the flow chart of the terminal peripheral control method in accordance with the second embodiment of the present invention is shown in FIG. 2, the scenario that this embodiment is suitable for is that the control device does not log in, and compared with the first embodiment, the user is verified by the M2M service platform or the M2M application server in the second embodiment, and as shown in FIG. 2, the method comprises the following steps:

in step 201, the user of M2M gateway registers in the M2M service platform or the M2M application server.

the user who needs to access the M2M gateway can only access the M2M gateway after having successfully registered in the M2M service platform or the M2M application server.

The user registration process is described as follows:

the user needs to register one user name and password under the permission of the M2M application service provider, for example, username: user1
password: 123456 in step 202, the control device sends an access request carrying the user information to the M2M gateway.

The control device selects the M2M gateway to be connected in the local interface and inputs the user information, and includes it in the access request and sends it to the M2M gateway.

In step 203, the M2M gateway receives the user information of the control device and sends it to the M2M service platform or the M2M application server.

In step 204, the M2M service platform or the M2M application server performs a user verification.

The M2M service platform or the M2M application server searches whether there is the user name in the user information database or not, if yes, then it verifies whether the password corresponding to the user in the local user information database is consistent with the password of the user name sent by the control device or not.

In step 205, the M2M service platform or the M2M application server sends a message to the M2M gateway to notify the verification result, and sends the operation authority of user to the M2M gateway when the verification is successful.

If the password in the user information database is inconsistent with the password sent by the control device, the M2M service platform or the M2M application server sends a message to the M2M gateway and notifies the M2M gateway that the user verification fails; if the password in the user information database is consistent with the password sent by the control device, the M2M service platform or the M2M application server sends a message to the M2M gateway and notifies the M2M gateway that the user verification is passed and the operation authority of the user is sent to the M2M gateway.

In step 206, the M2M gateway sends an access response message to the control device.

If the user verification fails, the M2M gateway sends an access response message to the control device and indicates in the access response message that the access fails. If the user verification is successful, the M2M gateway sends an access response message to the control device and indicates in the access response message that the access is successful.

In step 207, the control device receives the access response message sent by the M2M gateway; if the access response message indicates that the access is successful, it is to proceed to step 208, and if the access response message indicates that the access fails, the process ends.

In step 208, the control device sends a transaction control message to the M2M gateway, wherein the transaction control message comprises transaction information corresponding to one or more operations and required to be executed.

The transaction information comprises one or more operations and information of the terminal peripheral executing the corresponding operations; or, the transaction information is a transaction identifier; before sending a command to the terminal peripheral, the M2M gateway searches for one or more operations corresponding to the transaction identifier as well as the corresponding terminal peripheral information according to the local database.

In step 209, the M2M gateway performs the operation authority authentication, and if the authority authentication is successful, it is to proceed to step 210, and if the authority authentication fails, it is to proceed to step 212.

After receiving the transaction control message of the control device, the M2M gateway searches for the operation authority corresponding to the user in the local user information database, if the operations contained in the transaction are not allowed to be executed, the M2M gateway sends a control feedback message to the control device, wherein the control feedback message indicates that there is no authority to execute the transaction. The operation authority is set when the user registers, and the allowable operations corresponding to each operation authority are preconfigured in the gateway, and the operation authority is set as follows:

administrator operation authority: allow modifying the configuration parameters of the terminal peripheral and the gateway, allow upgrading the software or firmware of the terminal peripheral and the gateway, and allow executing various command operations on the terminal peripheral and the gateway.

Family member operation authority: allow performing various command operations on the terminal peripheral and the gateway, allow reading the terminal peripheral data, such as, the degree of the intelligent electrical meter, the degree of the intelligent gas meter as well as the degree of the intelligent water meter.

Guest operation authority: allow performing the video sharing operation and the multi-screen sharing operation.

In step 210, the M2M gateway sends an operation command to the terminal peripheral according to the transaction information required to be executed.

The operation command sent by the M2M gateway to the terminal peripheral is for a single operation or for all operations of the terminal peripheral.

The single operation contained in the transaction indicates which terminal peripheral will execute the operation. The executing logic unit is the M2M application running in the terminal peripheral.

In step 211, the terminal peripheral sends an operation command feedback message to the M2M gateway, and the feedback message comprises an operation command execution result (operation is successful or fails), and/or the feedback data.

In step 212, the M2M gateway sends a control feedback message to the control device.

If the operation execution fails within the transaction valid time, the M2M gateway sends a control feedback message to the control device, wherein the control feedback message indicates that the transaction execution fails.

After all operations are executed successfully, the M2M gateway sends a control feedback message to the control device, wherein the control feedback message indicates that the transaction is executed successfully and/or the feedback data. It comprises three cases herein: A, only indicating that the transaction is executed successfully; B, only indicating the feedback data; C indicating that the transaction is executed successfully and also comprising the feedback data.

If the operating authority authentication fails, the M2M gateway sends a control feedback message to the control device, wherein the control feedback message indicates that there is no authority to execute the transaction.

The Third Embodiment

Figure 3:
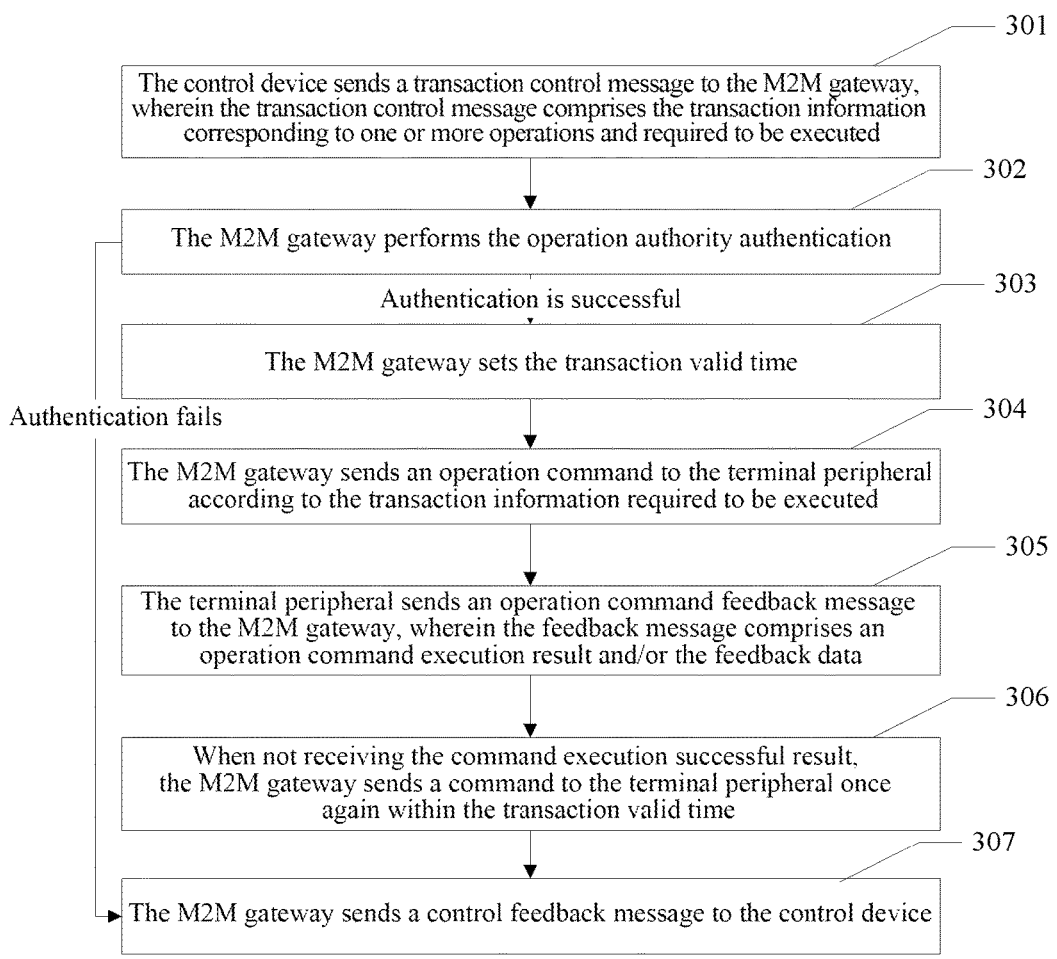
FIG. 3 is a schematic diagram of the flow chart of a terminal peripheral control method in accordance with a third embodiment of the present invention.

The schematic diagram of the flow chart of the terminal peripheral control method in accordance with the third embodiment of the present invention is shown in FIG. 3, the control device has logged in and directly sends a transaction control message in the third embodiment, as shown in FIG. 3, the method comprises the following steps:

in step 301, the control device sends a transaction control message to the M2M gateway, wherein, the transaction control message comprises the transaction information corresponding to one or more operations and required to be executed.

As above described, the transaction information comprises one or more operations and information of the terminal peripheral executing the corresponding operations; or, the transaction information is a transaction identifier; before sending a command to the terminal peripheral, the M2M gateway searches for one or more operations corresponding to the transaction identifier as well as the corresponding terminal peripheral information according to the local database.

In step 302, the M2M gateway performs the operation authority authentication, and if the authority authentication is successful, it is to proceed to step 303, and if the authority authentication fails, it is to proceed to step 307.

After receiving the transaction control message of the control device, the M2M gateway searches for the operation authority corresponding to the user in the local user information database, if the operations contained in the transaction are not allowed to be executed, the M2M gateway sends a control feedback message to the control device, and the control feedback message indicates that there is no authority to execute the transaction. The operation authority is set when the user registers, and the allowable operations corresponding to each operation authority are preconfigured in the gateway, and the operation authority is set as follows:

administrator operation authority: allow modifying the configuration parameters of the terminal peripheral and the gateway, allow upgrading the software or firmware of the terminal peripheral and the gateway, and allow executing various command operations on the terminal peripheral and the gateway.

Family member operation authority: allow performing various command operations on the terminal peripheral and the gateway, allow reading the terminal peripheral data, such as, the degree of the intelligent electrical meter, the degree of the intelligent gas meter as well as the degree of the intelligent water meter.

Guest operation authority: allow performing the video sharing operation and the multi-screen sharing operation.

In step 303, the M2M gateway sets the transaction valid time.

In step 304, the M2M gateway sends an operation command to the terminal peripheral according to the transaction information required to be executed.

The operation command sent by the M2M gateway to the terminal peripheral is for a single operation or for all operations of the terminal peripheral.

The single operation contained in the transaction indicates which terminal peripheral will execute the operation. The executing logic unit is the M2M application running in the terminal peripheral.

In step 305, the terminal peripheral sends an operation command feedback message to the M2M gateway, wherein the feedback message comprises an operation command execution result (operation is successful or fails), and/or the feedback data.

In step 306, when not receiving the command execution successful result, the M2M gateway sends a command to the terminal peripheral once again within the transaction valid time.

Herein the "not receiving the command execution successful result" comprises two cases, the first is receiving a failure result, and the second is not receiving any feedback.

Alternatively, each operation command is set with a maximum waiting time, if no success or failure feedback is not received from the terminal peripheral within this maximum waiting time and within the transaction valid time, the operation command is re-sent.

When the operation execution fails, the M2M gateway resends the operation command to the terminal peripheral within the transaction valid time.

In step 307, the M2M gateway sends a control feedback message to the control device.

If the operation execution fails within the transaction valid time, the M2M gateway sends a control feedback message to the control device, wherein the control feedback message indicates that the transaction execution fails.

After all the operations are executed successfully, the M2M gateway sends a control feedback message to the control device, and the control feedback message indicates that the transaction is executed successfully and/or the feedback data. It comprises three cases herein: A, only indicating that the operation is successful; B, only indicating the feedback data; C indicating that the operation is successful and also comprising the feedback data.

If the operating authority authentication fails, the M2M gateway sends a control feedback message to the control device, wherein the control feedback message indicates that there is no authority to execute the transaction.

The Fourth Embodiment

Figure 4:
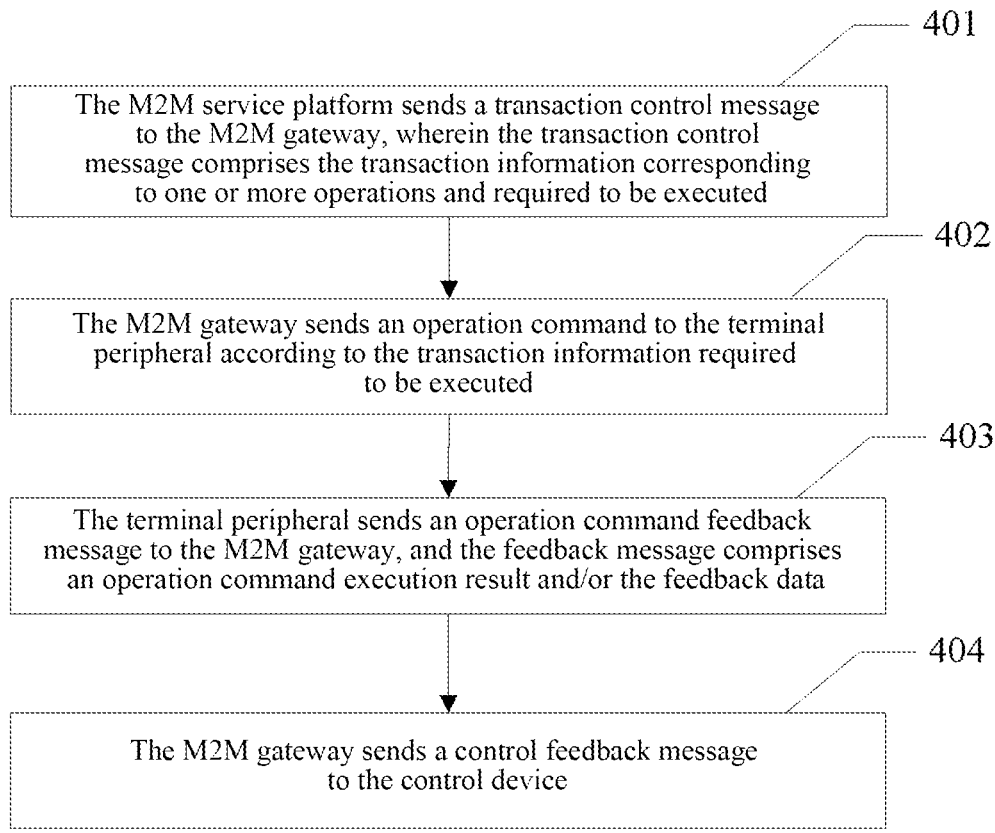
FIG. 4 is a schematic diagram of the flow chart of a terminal peripheral control method in accordance with a fourth embodiment of the present invention.

The schematic diagram of the flow chart of the terminal peripheral control method in accordance with the fourth embodiment of the present invention is shown in FIG. 4, and different from the third embodiment, the transaction control message is sent by the M2M service platform in the fourth embodiment, and because of the property of the M2M service platform itself, there is no need to execute the operation authority authentication, as shown in FIG. 4, and the method comprises the following steps:

in step 401, the M2M service platform sends a transaction control message to the M2M gateway, wherein, the transaction control message comprises the transaction information corresponding to one or more operations and required to be executed.

As above described, the transaction information comprises one or more operations and information of the terminal peripheral executing the corresponding operations; or, the transaction information is a transaction identifier; before sending a command to the terminal peripheral, the M2M gateway searches for one or more operations corresponding to the transaction identifier as well as the corresponding terminal peripheral information according to the local database.

Alternatively, the M2M gateway sets the transaction valid time.

The transaction valid time is a reasonable data determined by the manufacturer according to the data in the actual operation experiment, through fully considering factors such as the network delay, time needed for the operation execution as well as the signaling processing delay of the terminal peripheral.

In step 402, the M2M gateway sends an operation command to the terminal peripheral according to the transaction information required to be executed.

Alternatively, the M2M gateway sends an operation command to the terminal peripheral for the single operation included in the transaction.

The single operation included in the transaction indicates which terminal peripheral will execute the operation. The executing logic unit is the M2M application running in the terminal peripheral.

In step 403, the terminal peripheral sends an operation command feedback message to the M2M gateway, and the feedback message comprises an operation command execution result (operation is successful or fails) and/or the feedback data.

In the case that the M2M gateway sets the transaction valid time, when not receiving the command execution successful result, the M2M gateway sends a command to the terminal peripheral once again within the transaction valid time.

When the operation execution fails, the M2M gateway sends an operation command to the terminal peripheral once again within the transaction valid time. If the operation execution fails within the transaction valid time, the M2M gateway sends a control feedback message to the M2M service platform, wherein the control feedback message indicates that the transaction execution fails In step 404, the M2M gateway sends a control feedback message to the control device.

If the operation execution fails within the transaction valid time, the M2M gateway sends a control feedback message to the control device, wherein the control feedback message indicates that the transaction execution fails.

After all the operations are executed successfully, the M2M gateway sends a control feedback message to the M2M service platform, wherein the control feedback message indicates that the transaction is executed successfully and/or the feedback data. It comprises three cases herein: A, only indicating that the operation is successful; B, only indicating the feedback data; C indicating that the operation is successful and also comprising the feedback data.

Figure 5:
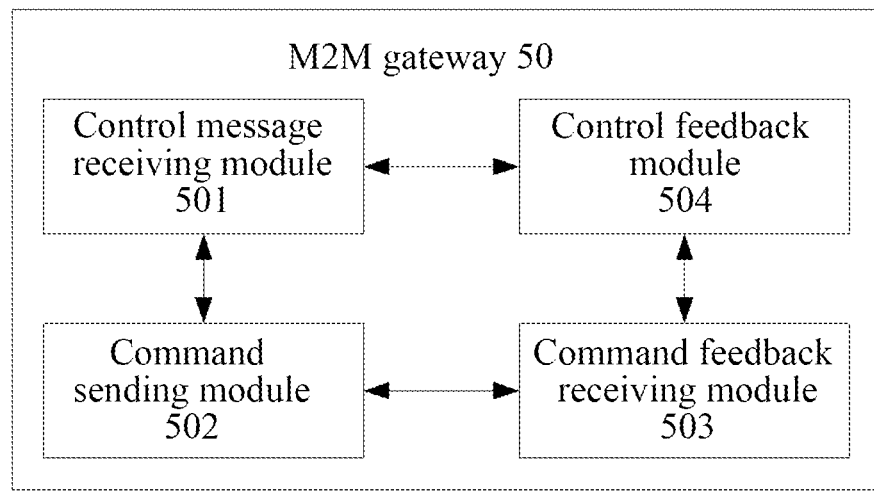
FIGS. 5-7 are schematic diagrams of the module structure of a machine to machine gateway in accordance with an embodiment of the present invention.

To achieve the abovementioned method, the embodiment of the present invention further provides M2M gateway 50, as shown in FIG. 5, the M2M gateway 50 comprises:

a control message receiving module 501, used to: receive a transaction control message sent by a control device or a M2M service platform, wherein the transaction control message comprises transaction information corresponding to one or more operations and required to be executed;

a command sending module 502, used to: send an operation command to the terminal peripheral according to the transaction information required to be executed;

a command feedback receiving module 503, used to: receive a command feedback message of the terminal peripheral, wherein, the command feedback message comprises an operation command execution result; and a control feedback module 504, used to: send a control feedback message to the control device or the M2M service platform, wherein the control feedback message carries a transaction execution result obtained according to the operation execution result.

Figure 6:
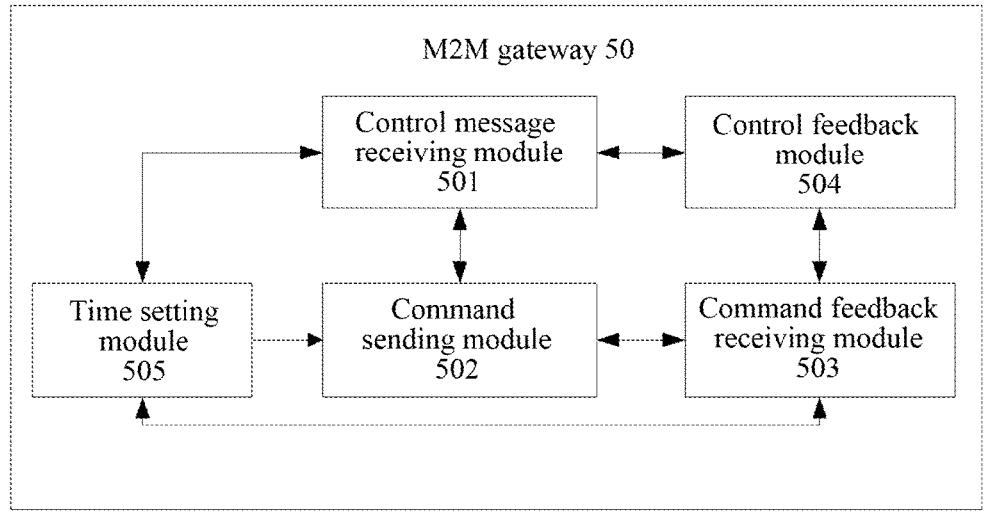

Alternatively, as shown in FIG. 6, the M2M gateway further comprises:

a time setting module 505, which is used to: set a transaction valid time based on the received transaction control message;

the command sending module 502 is further used to: within the transaction valid time, re-send an operation command to the terminal peripheral when not receiving a command execution successful result.

Alternatively, the transaction information comprises one or more operations and the information of the terminal peripheral executing the corresponding operations; or, the transaction information is a transaction identifier; before sending a command to the terminal peripheral, the M2M gateway searches for one or more operations corresponding to the transaction identifier as well as the corresponding terminal peripheral information in accordance with the local database.

Alternatively, the operation command sent by the M2M gateway to the terminal peripheral is for a single operation or for all the operations of the terminal peripheral.

Alternatively, the command feedback message further comprises the feedback data.

Figure 7:
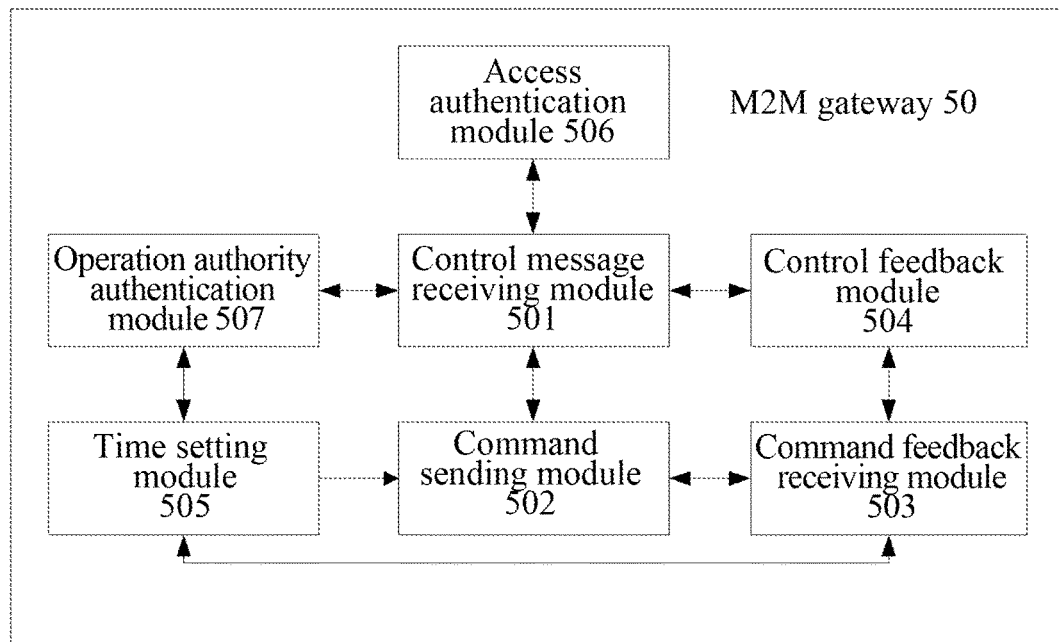

Alternatively, as shown in FIG. 7, the M2M gateway further comprises: an access authentication module 506, which is used to perform an access authentication on the control device according to the local user information database.

Alternatively, as shown in FIG. 7, the M2M gateway further comprises: an operation authority authentication module 507, which is used to: perform an operation authority authentication on the transaction information required to be executed according to the local user information database; the time setting module 505 sets the transaction valid time when the operation authority authentication is successful.

Figure 8:
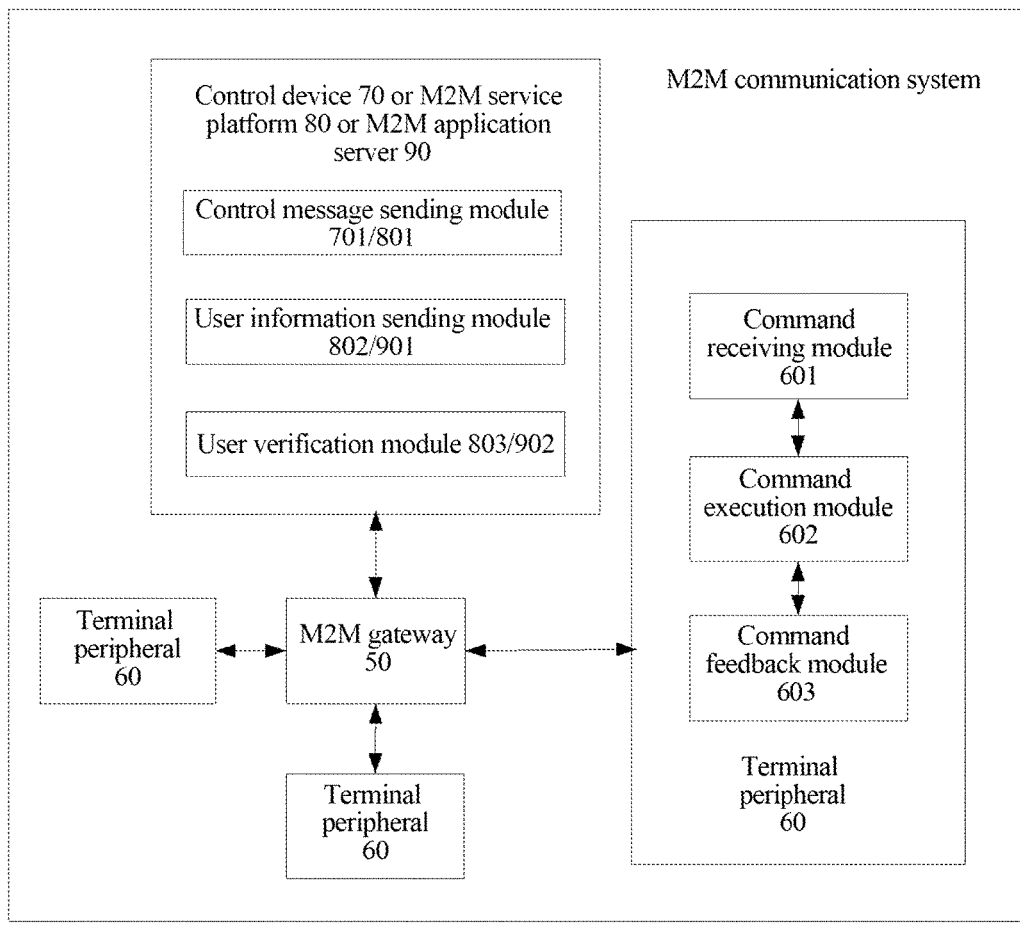
FIG. 8 is a schematic diagram of the module structure of a machine to machine communication system in accordance with an embodiment of the present invention.

In addition, the embodiment of the present invention further provides a machine-to-machine (M2M) communication system, as shown in FIG. 8, the system comprises: the abovementioned M2M gateway 50 and terminal peripheral 60 as well as at least one of the control device 70, M2M service platform 80 and M2M application server 90, wherein:

the control device 70 or the M2M service platform 80 comprises: a control message sending module 701/801, which is used to: send a transaction control message to the M2M gateway 50;

the terminal peripheral 60 comprises:

a command receiving module 601, which is used to: receive an operation command sent by the M2M gateway 50;

a command execution module 602, which is used to: execute the operation command; and a command feedback module 603, which is used to: send an operation command feedback message to the M2M gateway 50.

Alternatively, the M2M service platform 80 or the M2M application server 90 comprises: a user information sending module 802/901, which is used to: send the user information registered by the user to the M2M gateway 50; or, the M2M service platform 80 or the M2M application server 90 further comprises: a user verification module 803/902, which is used to: perform a user verification according to the user information database, and send a user verification result to the M2M gateway 50.

With the method, the M2M gateway and the M2M communication system according to the embodiment of the present invention, after introducing the intelligent gateway to manage the terminal peripheral in the M2M application scenarios, the local control device accesses and controls the terminal peripheral, such as obtaining the data, searching for the operating state of the terminal peripheral and instructing the terminal peripheral to execute the specified operation, by accessing the gateway. In order to ensure the usage safety of the terminal peripheral, the M2M gateway can be used to verify the legality of the control device, meanwhile it can also execute the access authority verification for the control device, and ensure that the control device can only access a specified terminal peripheral.

In the terminal peripheral control method and the M2M gateway as well as the communications system according to the embodiment of the present invention, the M2M gateway receives a transaction control message sent by the control device or the M2M service platform, namely, the control device or the M2M service platform takes a transaction as unit to send the signaling, and one transaction corresponds to one or more operations, it may also correspond to a plurality of terminal peripherals, thus greatly reducing the amount of signaling and saving network resources.

Because of different communication environments (for example, some terminal peripherals are connected with the M2M gateway through a wired connection, some other terminals peripherals are connected with the M2M gateway through the WIFI, and the wireless communication can be affected, such as being disturbed or going through walls and so on, which may cause the execution to fail), and some operations may fail to execute successfully, this leads to the failure to execute the entire transaction, and after the network feedback fails, the M2M service platform may require to re-execute it once, thus increasing the signaling interaction and consuming unnecessary network resources. For this situation, alternatively, after receiving a transaction control message, the M2M gateway in accordance with the embodiment of the present invention sets a transaction valid time based on the received transaction control message, namely, provides a buffering time to various operations in the transaction executed by the gateway, allowing attempting to execute the failed operations again within the transaction valid time, thereby increasing the transaction execution successful rate, reducing the signaling overhead and saving network resources.

Those ordinarily skilled in the art can understand that all or some of steps of the abovementioned method may be completed by the programs instructing the relevant hardware, and the programs may be stored in a computer-readable storage medium, such as read only memory, magnetic or optical disk. Alternatively, all or some of the steps of the abovementioned embodiments may also be implemented by using one or more integrated circuits. Accordingly, each module/unit in the abovementioned embodiments may be realized in a form of hardware, or in a form of software function modules. The present document is not limited to any specific form of hardware and software combinations.

The modules in the system/device described in the embodiments of the present invention are only one example divided according to their functions, understandably, in the case that the system/device achieves the same function, one skilled in the art can give one or more other functional division methods, and in applications, any one or more functional modules therein may be implemented with one functional entity apparatus or unit, and undeniably, the above conversion methods are within the protection scope of the present application.

Obviously, the described embodiments are merely part of embodiments of the present invention, but not all embodiments. Based on the embodiments of the present invention, all other embodiments obtained by those of ordinary skill on the premise of no any creative work made should fall within the protection scope of the appended claims of the present document.

INDUSTRIAL APPLICABILITY

The technical solution in accordance with the embodiment of the present invention can reduce the amount of signaling and save network resources.

What is claimed is:

1. A method for controlling terminal peripheral, comprising:
   a Machine to Machine (M2M) gateway receiving a transaction control message sent by a control device; wherein the control device controls a terminal peripheral by using the transaction control message; wherein the transaction control message comprises transaction information corresponding to one or more operations required to be executed on the terminal peripheral;
   the M2M gateway sending an operation command to the terminal peripheral according to the transaction information;
   the M2M gateway receiving a command feedback message of the terminal peripheral, wherein the command feedback message comprises an operation command execution result; and
   the M2M gateway sending a control feedback message to the control device, wherein the control feedback message carries a transaction execution result obtained according to an operation execution result,
   wherein, one transaction control message corresponds to the same operation of a plurality of terminal peripherals, or a plurality of operations of one terminal peripheral or a plurality of operations of a plurality of terminal peripherals;
   the transaction information is a transaction identifier;
   before the M2M gateway sends the operation command to the terminal peripheral, searching for operations corresponding to the transaction identifier according to a local database.

2. The method of claim 1, further comprising:
   after receiving the transaction control message, the M2M gateway setting a transaction valid time based on the received transaction control message;
   when a command execution successful result is not received within the transaction valid time, the M2M gateway re-sending the operation command to the terminal peripheral.

3. The method of claim 2, further comprising: after the M2M gateway receives the transaction control message, and before setting the transaction valid time, the M2M gateway performing an operation authority authentication on the transaction information according to a local user information database, wherein the operation authority authentication is successful.

4. The method of claim 2, wherein,
   the operation command sent by the M2M gateway to the terminal peripheral is for all operations of the terminal peripheral.

5. The method of claim 2, wherein,
   the command feedback message further comprises feedback data.

6. The method of claim 2, further comprising: before the M2M gateway receives the transaction control message of the control device,
   the M2M gateway performing an access authentication on the control device according to a local user information database.

7. The method of claim 2, further comprising: before the M2M gateway receives the transaction control message of the control device,
   a M2M service platform or a M2M application server performing a user verification on the control device according to a user information database;
   when the verification is successful, the M2M service platform or the M2M application server sending a verification result to the M2M gateway; and
   the M2M gateway performing an access authentication on the control device according to the verification result.

8. The method of claim 1, wherein,
   the operation command sent by the M2M gateway to the terminal peripheral is for all operations of the terminal peripheral.

9. The method of claim 1, wherein,
   the command feedback message further comprises feedback data.

10. The method of claim 1, further comprising: before the M2M gateway receives the transaction control message of the control device,
    the M2M gateway performing an access authentication on the control device according to a local user information database.

11. The method of claim 1, further comprising: before the M2M gateway receives the transaction control message of the control device,
    a M2M service platform or a M2M application server performing a user verification on the control device according to a user information database;
    when the verification is successful, the M2M service platform or the M2M application server sending a verification result to the M2M gateway; and
    the M2M gateway performing an access authentication on the control device according to the verification result.

12. A machine to machine (M2M) gateway, comprising:
    a processor, and
    a non-transitory computer readable medium storing program codes which, when executed by the processor, cause the processor to:

receive a transaction control message sent by a control device; wherein the control device controls a terminal peripheral by using the transaction control message; wherein the transaction control message comprises transaction information corresponding to one or more operations required to be executed on the terminal peripheral;

send an operation command to the terminal peripheral according to the transaction information;

receive a command feedback message of the terminal peripheral, wherein the command feedback message comprises an operation command execution result; and send a control feedback message to the control device, wherein the control feedback message carries a transaction execution result obtained according to an operation execution result, wherein, one transaction control message corresponds to the same operation of a plurality of terminal peripherals, or a plurality of operations of one terminal peripheral or a plurality of operations of a plurality of terminal peripherals;

the transaction information is a transaction identifier;

wherein the program codes further cause the processor to:
before sending an operation command to the terminal peripheral, search for operations corresponding to the transaction identifier in accordance with a local database.

13. The M2M gateway of claim 12, wherein the program codes further cause the processor to:

set a transaction valid time based on the received transaction control message; and in the transaction valid time, re-send an operation command to the terminal peripheral when receiving a command execution failure result.

14. The M2M gateway of claim 12, wherein, the operation command sent by the M2M gateway to the terminal peripheral is for all operations of the terminal peripheral.

15. A machine to machine (M2M) communication system, comprising: the M2M gateway and terminal peripheral of claim 12, as well as at least one of a control device, a M2M service platform and a M2M application server, wherein:

the control device sends a transaction control message to the M2M gateway;

the terminal peripheral receives an operation command sent by the M2M gateway, executes the operation command and sends an operation command feedback message to the M2M gateway.

16. The system of claim 15, wherein, the M2M service platform or the M2M application server sends user information registered by a user to the M2M gateway; or the M2M service platform or the M2M application server performs a user verification according to a user information database, and send a user verification result to the M2M gateway.

* * * * *